United States Patent [19]
Coleman et al.

[11] Patent Number: 5,527,152
[45] Date of Patent: Jun. 18, 1996

[54] ADVANCED WIND TURBINE WITH LIFT CANCELLING AILERON FOR SHUTDOWN

[75] Inventors: Clint Coleman; Theresa M. Juengst, both of Warren, Vt.; Michael D. Zuteck, Kemah, Tex.

[73] Assignee: Northern Power Systems, Inc., Moretown, Vt.

[21] Appl. No.: 206,867

[22] Filed: Mar. 4, 1994

[51] Int. Cl.⁶ .................................................. F04D 29/18
[52] U.S. Cl. ............................................ 416/23; 244/130
[58] Field of Search ...................... 416/23, 24; 244/130, 244/213, 215, 216

[56] References Cited

U.S. PATENT DOCUMENTS

| | | | |
|---|---|---|---|
| 2,493,041 | 1/1950 | Stalker | 416/90 A |
| 2,617,487 | 11/1952 | Stalker | 170/135.4 |
| 2,622,686 | 12/1952 | Chevreau et al. | 170/66 |
| 3,128,966 | 4/1964 | Alvarez-Calderon | 244/42 |
| 3,478,987 | 11/1969 | Dorand | 244/17.25 |
| 3,915,414 | 10/1975 | Shoulders | 416/20 R |
| 4,025,230 | 5/1977 | Kastan | 416/18 |
| 4,181,275 | 1/1980 | Moelter et al. | 244/213 |
| 4,286,922 | 9/1981 | Lew | 416/17 |
| 4,297,076 | 10/1981 | Donham et al. | 416/37 |
| 4,349,169 | 9/1982 | McAnally | 244/219 |
| 4,445,421 | 5/1984 | Walker et al. | 91/186 |
| 4,460,138 | 7/1984 | Sankrithi | 244/215 |
| 4,462,753 | 7/1984 | Harner et al. | 416/48 |
| 5,110,072 | 5/1992 | Owl et al. | 244/213 |
| 5,161,757 | 11/1992 | Large | 244/216 |
| 5,335,886 | 8/1994 | Greenhalgh | 244/213 |

FOREIGN PATENT DOCUMENTS

| | | | |
|---|---|---|---|
| 951186 | 10/1949 | France | 416/23 |
| 741304 | 9/1943 | Germany | 416/23 |
| 49585 | 4/1980 | Japan | 416/23 |
| 136581 | 8/1984 | Japan | 416/24 |
| 558045 | 12/1943 | United Kingdom . | |
| 637669 | 5/1950 | United Kingdom | 416/23 |

OTHER PUBLICATIONS

Snyder, M. H. et al., "Additional Reflection Plane Tests of Control Devices on an NACA 23024 Airfoil", Wind Energy Report No. 26, Wichita State University, Feb. 1985, pp. 1–44.

Miller et al., "Shutdown Characteristics of the MOD–O Wind Turbine with Aileron Controls", NASA, Lewis Research Center, DOE NASA/20320–61, NASA TM–8691, Cleveland, OH, May 1984.

Snyder et al., "Reflection Plane Test of Control Devices on a Thick Airfoil at High Angles of Attack", Wind Energy Report No. 23 revised, Lewis Research Center, Oct., 1984.

Corrigan et al., "Performance Tests on the Mod–O Wind Turbine with Aileron Control Surfaces", NASA Wind Energy Project Office, Lewis Research Center, Cleveland, OH, May 8, 1984.

(List continued on next page.)

*Primary Examiner*—John T. Kwon
*Attorney, Agent, or Firm*—Fish & Richardson

[57] ABSTRACT

An advanced aileron configuration for wind turbine rotors featuring an independent, lift generating aileron connected to the rotor blade. The aileron has an airfoil profile which is inverted relative to the airfoil profile of the main section of the rotor blade. The inverted airfoil profile of the aileron allows the aileron to be used for strong positive control of the rotation of the rotor while deflected to angles within a control range of angles. The aileron functions as a separate, lift generating body when deflected to angles within a shutdown range of angles, generating lift with a component acting in the direction opposite the direction of rotation of the rotor. Thus, the aileron can be used to shut down rotation of the rotor. The profile of the aileron further allows the center of rotation to be located within the envelope of the aileron, at or near the centers of pressure and mass of the aileron. The location of the center of rotation optimizes aerodynamically and gyroscopically induced hinge moments and provides a fail safe configuration.

28 Claims, 13 Drawing Sheets

OTHER PUBLICATIONS

Cao et al., "Performance and Aerodynamic Braking of a Horizontal–Axis Wind Turbine from Small–Scale Wind Tunnel Tests", NASA Lewis Research Center, Jul. 1987.

Savino et al., "Reflection Plane Tests of a Wind Turbine Blade Tip Section with Ailerons", NASA, Langley Research Center, Hampton, VA, Aug., 1985.

Miller et al., "Summary of NASA/DOE Aileron–Control Development Program for Wind Turbines", NASA Lewis Research Center, Cleveland, OH pp. 537–545.

Gregorek et al., "Comparison of Pressure Distributions on Model and Full–Scale NACA 64–621 Airfoils with Ailerons for Wind Turbine Application", NASA, Lewis Research Center, Apr. 1988.

Miller et al., "Aileron Controls for Wind Turbine Applications", NASA, Lewis Research Center, Aug., 1984.

Miller et al., "Brake Augmented Shutdown Analysis of the Mod–O with a 38% Chord Aileron–Control Rotor", NASA, Lewis Research Center, Cleveland, OH, Mar. 27, 1985.

Miller et al., "Analytical Model for Predicting Shutdown of a Two–Bladed Horizontal Axis Wind Turbine", NASA, Lewis Research Center, Jun., 1983.

Wentz et al., "Feasability Study of Aileron and Spoiler Control Systems for Large Horizontal Axis Wind Turbines", NASA, Lewis Research Center, May 1980.

Wentz et al., "Wind Tunnel Tests of Spoilers and Ailerons for Wind Turbine Power Control and Braking", Sandia Wind Turbine Aerodynamics Seminar, Mar. 1985.

Cao et al., "Performance and Aerodynamic Braking of a Horizontal–Axis Wind Turbine from Small–Scale Wind Tunnel Tests", Wind Energy Report No. 37, NASA, Lewis Research Center, Jul. 1985.

Miller et al., "Summary of 38 Percent Chord Aileron–Control Rotor Tests", NASA, Lewis Research Center, Fourth ASME, 1985.

Miller et al., "Analytical Model for Predicting Emergency Shutdown of a Two–Bladed Horizontal Axis Wind Turbine", NASA, Lewis Research Center, Sixth Biennial Wind Energy Conference and Workshop, pp. 803–813.

Brocklehurst, "Aerodynamic Control of Horizontal Axis Wind", BWEA, 1988, pp. 173–179.

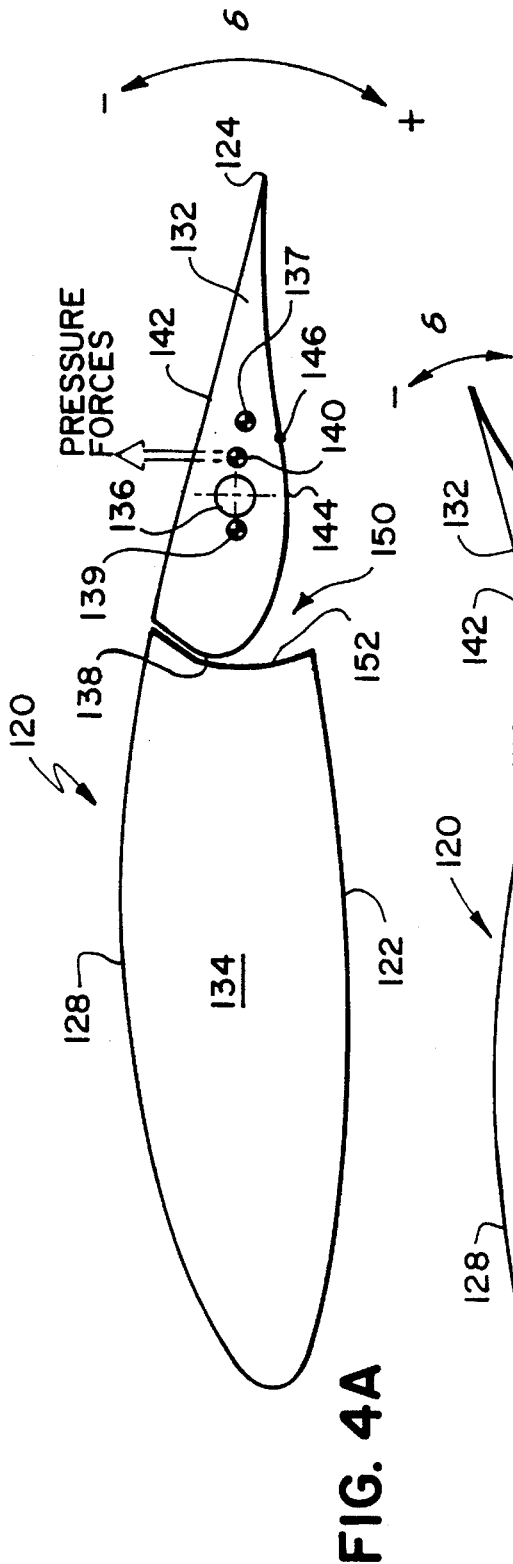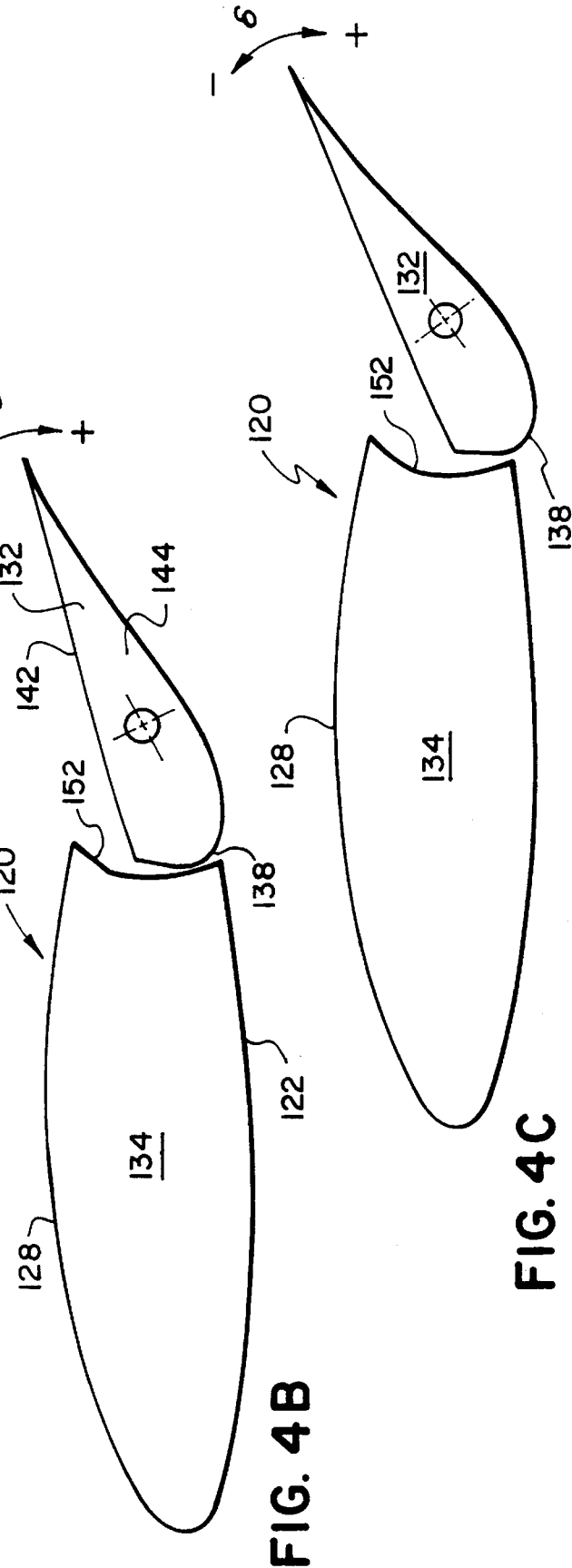
FIG. 4A
FIG. 4B
FIG. 4C (HYPOTHETICALLY MODIFIED PRIOR ART)

(HYPOTHETICALLY MODIFIED PRIOR ART)

5,527,152

ADVANCED WIND TURBINE WITH LIFT CANCELLING AILERON FOR SHUTDOWN

The government has rights in this invention pursuant to Subcontract No. ZA-2-11295-2 awarded by the United States Department of Energy to the National Renewable Energy Laboratory.

BACKGROUND OF THE INVENTION

This invention relates to wind turbines.

Over the past several years, there has been much research and development in the field of wind turbine-based electrical power generation. As the size and power generating capabilities of wind turbines has increased, the need for reliable control capabilities has increased accordingly. Specifically, the ability to compensate for varying wind conditions—from the ground to the top of the rotor assembly as well as from one point in time to the next—is highly desirable. The ability to shut down the rotor in the event the power load on the rotor is suddenly lost, to prevent catastrophic overspeed of the rotor, is critical.

Some prior wind turbine configurations have used pitch control schemes wherein the pitch of the entire rotor blade is varied. Other configurations have incorporated spoilers or ailerons at the trailing edges of the rotor blades. The spoilers or ailerons extend for a portion of the span of each rotor blade, typically near the outer end of the blade.

As shown in FIGS. 1A and 1B, a typical wind turbine assembly includes a rotor assembly 10 mounted to a gearbox assembly 12, which is in turn supported at the top of a tower structure 14. Through any of a variety of mechanisms known in the art, the combined rotor/gearbox assembly is rotated about the tower 14 such that the rotor faces into the oncoming free-stream wind. The free-stream wind is represented by the velocity vector $V_w$, which faces into the page in FIG. 1B. The rotor assembly 10, which may in some instances be constructed with a coning angle $\Delta$, typically has two or three rotor blades 20.

As shown in FIG. 2, the free-stream wind strikes the high pressure surface 22 of rotor blade 20 and is deflected towards the trailing edge 24, as indicated by curved arrows 25. The force of the air being deflected causes the rotor assembly 10 to begin rotating at an angular frequency $\Omega$, and the tangential velocity $V_\Omega$ at any radial position r along the rotor blade 20 is equal to $r \cdot \Omega$. The rotor blade "sees" a local relative wind, represented by the velocity vector $V_{rel}$ which is equal to the sum of the local tangential velocity $V_\Omega$ and the free-stream wind velocity $V_w$, which strikes the rotor blade 20 at a local angle of attack $\alpha$. It will be appreciated that, for a given free-stream wind velocity $V_w$ and angular frequency $\Omega$, the tangential velocity $V_\Omega$ and, hence, local relative wind and local angle of attack $\alpha$ will vary along the length of the rotor blade 20.

As the rotor blade 20 moves through the air, with a local relative wind having velocity $V_{rel}$ at any given position r, lift L is generated normal to the local relative wind. The lift L has a component $L \cdot \sin(\theta)$ in the direction of rotation, where $\theta$, the relative wind angle, is equal to the local angle of attack $\alpha$ plus the local pitch or twist angle $\phi$, the angle between the chord line 26 and the plane of rotation 16. Drag D, parallel to the local relative wind, has a component $D \cdot \cos(\theta)$ opposite the direction of rotation. The net aerodynamic force in the direction of rotation, referred to as the suction force S and equal to $L \cdot \sin(\theta) - D \cdot \cos(\theta)$, imparts a torque on the rotor assembly 10. The angular velocity $\Omega$ will increase, under the influence of the torque, until the suction force S is balanced by retarding forces, e.g., power load and friction.

As noted above, the use of ailerons at the trailing edge of the rotor blades has been investigated for regulating the performance of wind turbines. The ailerons are located at the outer region of the rotor blade and typically have a length on the order of 30% of the total blade length. Configurations previously tested, as illustrated in FIGS. 3A, 3B, 3C, and 3D, have typically employed ailerons 32 which are little more than discrete, segmented portions of the rotor blade 20 itself. These ailerons, usually comprising about 20% to 38% of the total rotor blade chord, have been hinged to the main section 34 of the rotor blade 20 along the low pressure surface 28. They have often been attached via a hinge 36 located right at the leading edge 38 of the aileron 32, as shown in FIGS. 3A and 3B. Alternatively, in other configurations as shown in FIGS. 3C and 3D, the hinge 36 has been mounted at the end of an extension plate 40 such that a flow gap 41 is formed between the aileron 32 and the main section 32 of the rotor blade 20 as the aileron 32 is rotated. The flow gap 41 allows air to flow from the high pressure surface 22 of the rotor blade to the low pressure surface 28 of the rotor blade.

In both of these configurations, deflection of the aileron 32 changes the lift generated by the rotor blade by modifying the camber of the rotor blade 20 and, especially where the configuration provides a flow gap 41, by disrupting the airflow over the low pressure surface 28. Additionally, deflection of the aileron 32 increases drag on the rotor blade 20. Given a large enough deflection, the aileron 32 can be used to slow substantially the rotation of the rotor assembly 10. It has not previously been possible, however, to stop the rotation entirely using just ailerons because the negative suction force generated by the aileron portion of the blade has been insufficient to overcome the positive suction force generated over the non-aileron sections of the blade.

Furthermore, where the hinge 36 is located along the low pressure surface 28, either at or slightly behind the leading edge 38 of the aileron, deflecting the aileron 32 moves the center of mass of the aileron transverse to the direction of rotation of the rotor blade 20. For a large scale wind turbine, i.e., one having a rotor diameter on the order of sixty feet or more, rotating at a frequency $\Omega$ on the order of fifty revolutions per minute or more, gyroscopically induced moments on the aileron 23 can be quite large. These moments lead to excessive "wear and tear" on the hinge 36, as well as on the actuation mechanism used to deflect the aileron 32.

SUMMARY OF THE INVENTION

This invention provides a wind turbine rotor configuration which employs ailerons to regulate as well as shut down rotation of the rotor. The mounting arrangement optimizes hinge moments, thereby reducing wear and tear on the component parts.

In preferred embodiments, the blades of the rotor consist of a main section and an aileron rotatably connected to the main section. When deflected to angles within a shutdown range of angles, the aileron generates lift, which acts opposite the direction of rotation of the rotor, sufficient to bring the rotor to a complete, or virtually complete, stop. Preferably, the aileron has a wing-like, arcuate airfoil shape which is inverted, relative to the airfoil shape of the main section. As a result of this configuration, the aileron modifies lift and drag on the rotor blade, when deflected to angles within a control range of angles, in a smoothly continuous, predictable manner that enables strong positive control of the rotor; and when deflected to angles within a shutdown range of angles, the aileron generates lift with a component acting in the direction opposite the direction of rotation.

The aileron can be provided with lift enhancing devices, such as a deflector vane or vorticity generators, along its leading edge. The lift enhancing devices remain hidden within a cove along the underside of the blade while the aileron is within the control range of deflection angles. They are exposed to the windstream and help keep the boundary layer attached to the low pressure surface of the aileron when it is rotated into the shutdown range of angles.

The arcuate airfoil shape of the aileron allows optimization of hinge moments acting on the aileron by optimizing the location of the hingeline about which the aileron rotates. The hingeline lies within the envelope of the aileron. Preferably, the hingeline is at or near the center of mass of the aileron. Additionally, it is preferably at or near, and preferably ahead of, the center of pressure of the aileron. This configuration reduces aerodynamically and gyroscopically induced moments about the hingeline, which helps reduce the size and weight of the actuator assembly required and wear and tear on the components of the system. It also yields a fail-safe arrangement whereby the aileron will rotate to a lift-reducing, rotor-slowing deflection angle upon loss of power to the aileron actuation system.

BRIEF DESCRIPTION OF THE DRAWINGS

FIGS. 4A, 4B, and 4C are section views of a wind turbine rotor blade and aileron, according to the invention, showing the aileron at various deflection angles δ within the control range of angles.

DESCRIPTION OF THE PREFERRED EMBODIMENTS

Figure 1A:
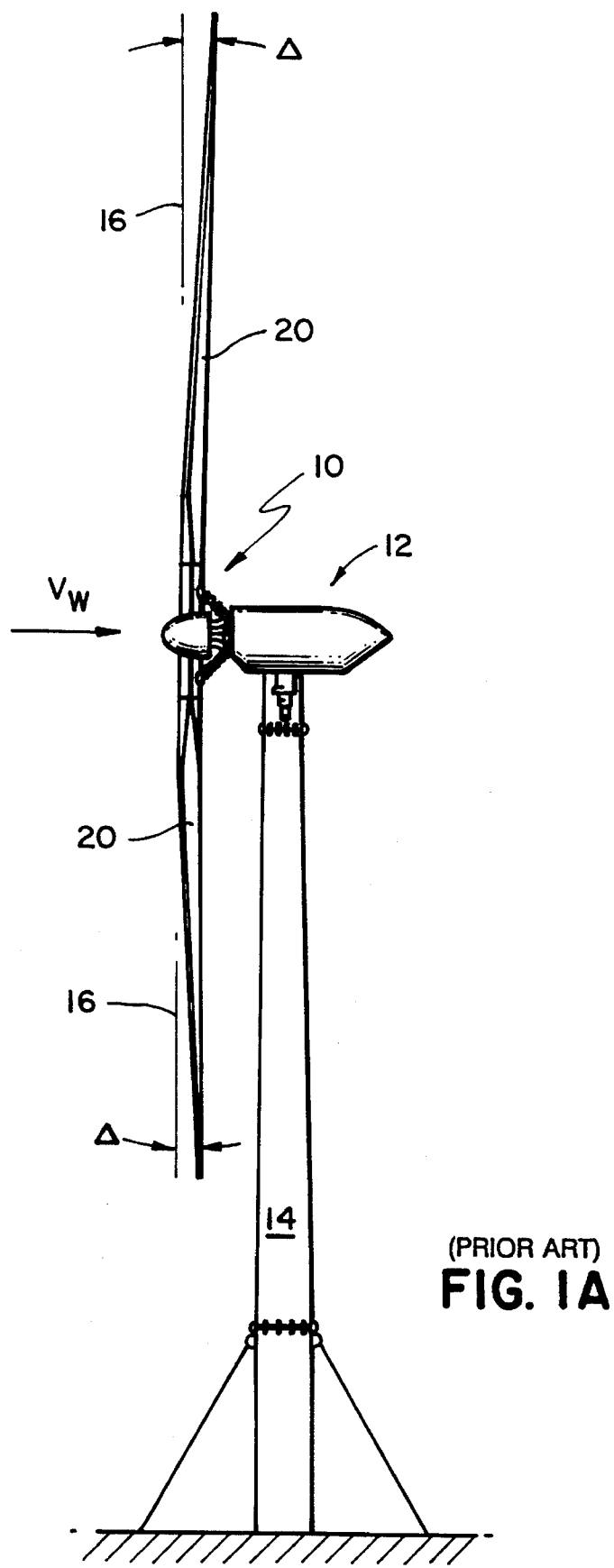
FIGS. 1A and 1B are side and downwind views of a typical wind turbine.
Figure 1B:
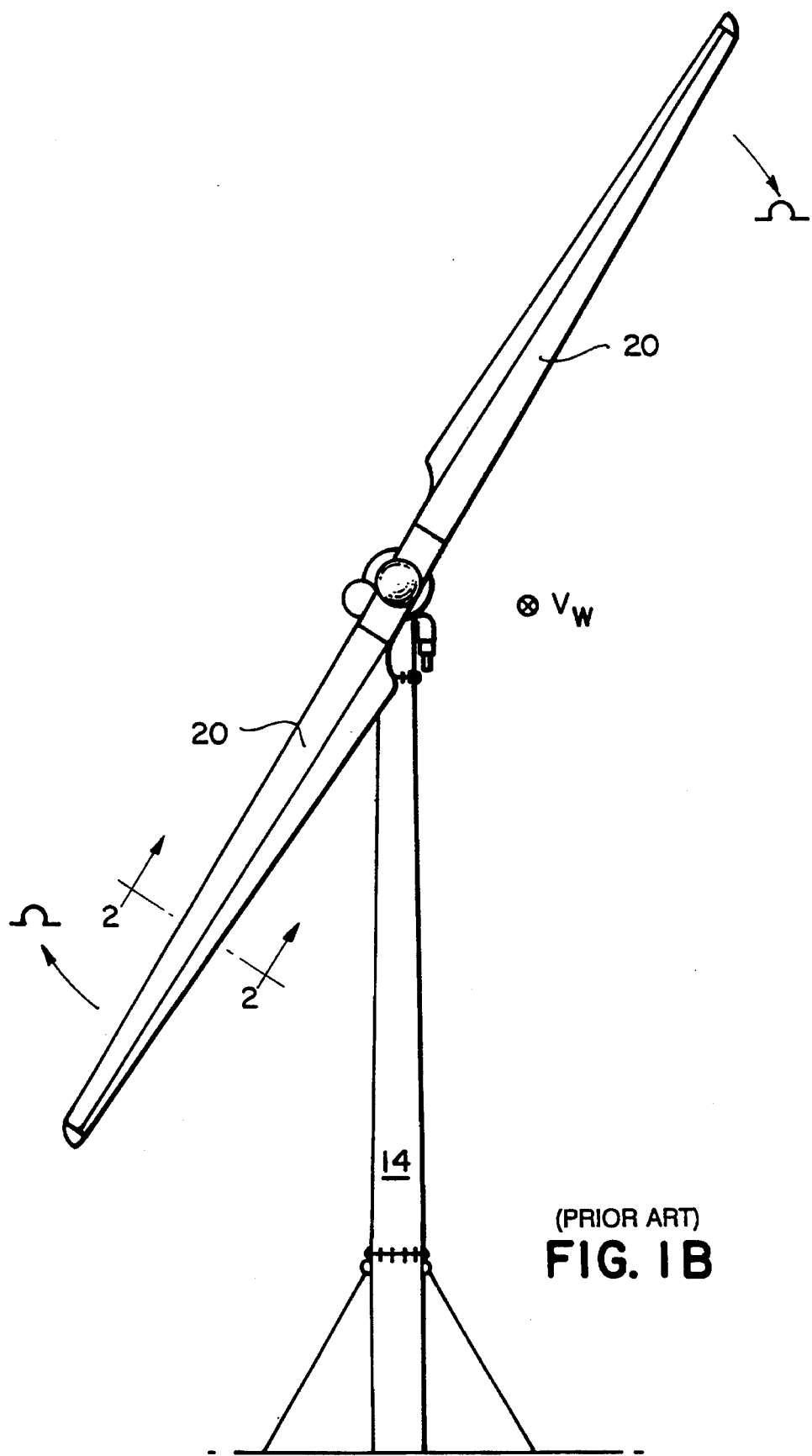
Figure 2:
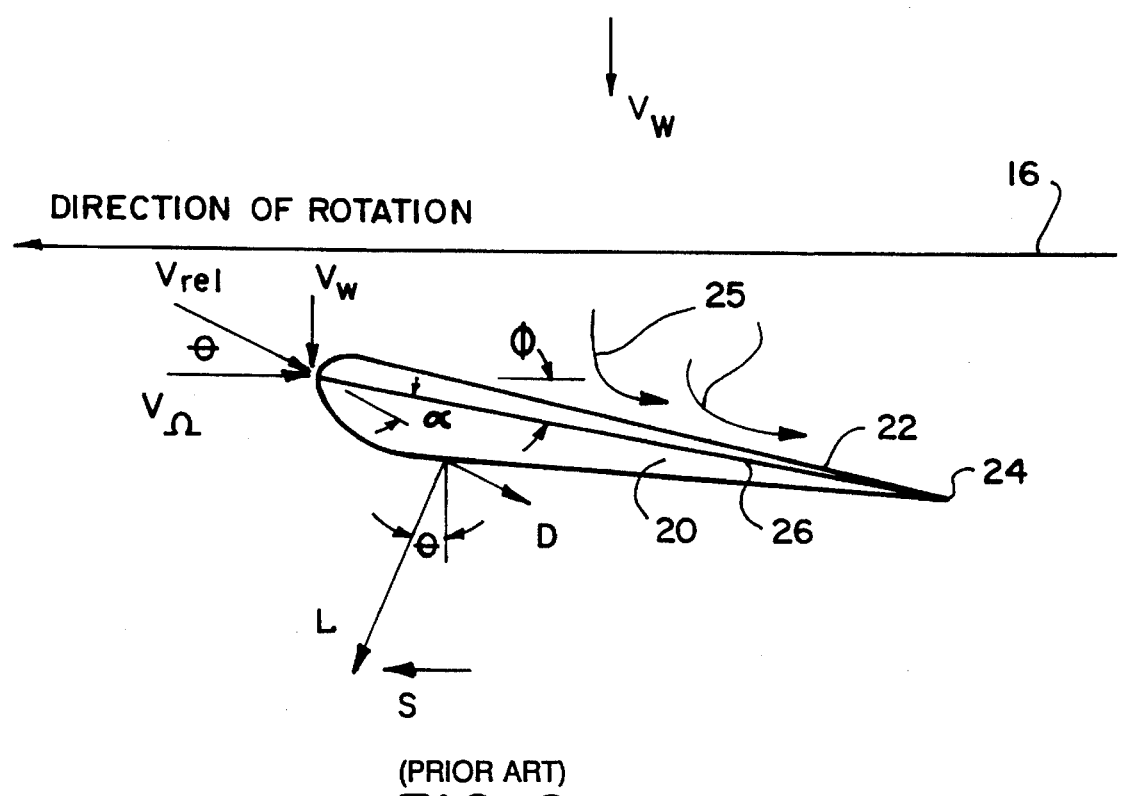
FIG. 2 is a section view of a wind turbine rotor blade, taken along line 2—2 of FIG. 1, showing the generation of aerodynamic forces on the rotor blade.
Figure 3A:
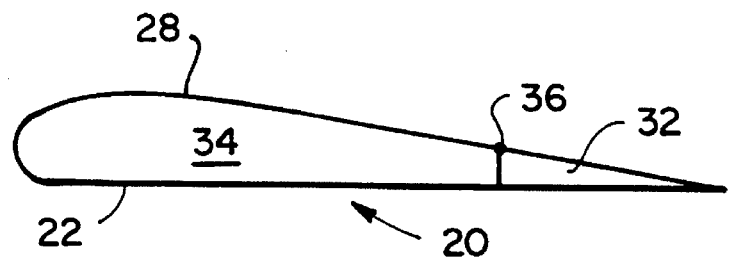
FIGS. 3A, 3B, 3C, and 3D are section views of wind turbine rotor blades with ailerons as previously employed within the art.
Figure 3B:
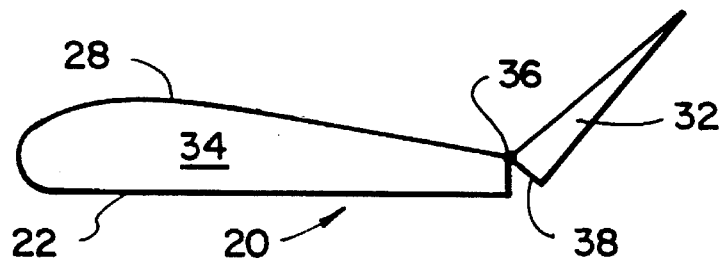
Figure 3C:
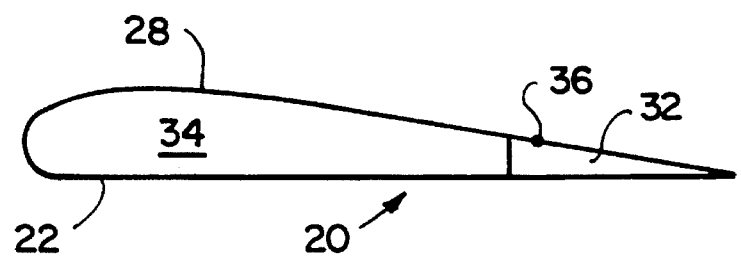
Figure 3D:
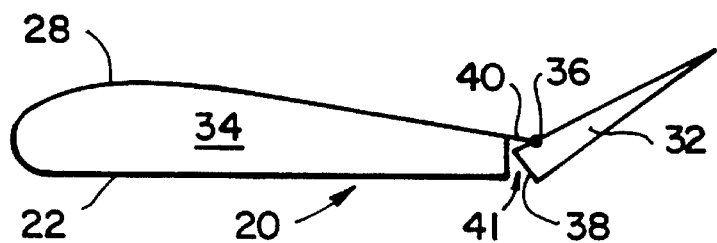

According to the invention, as shown in FIG. 4A, a rotor blade 120 has a main section 134 and an aileron 132. Unlike ailerons previously employed on wind turbine rotors, the aileron 132 is designed as a separate lifting body having a wing-shaped, arcuate airfoil profile. The airfoil is described as "wing-shaped" and "arcuate" to distinguish the aileron from prior art ailerons, or even flat plates, which, technically, could be considered airfoils.

The airfoil profile of aileron 132 is inverted relative to the overall airfoil profile of rotor blade 120. Thus, when the aileron 132 is non- or minimally deflected, the high pressure surface 142 of the aileron 132—considering the aileron 132 as a separate lifting body—constitutes a portion of the low pressure surface 128 of the overall rotor blade 120 and functions as a low pressure surface. Similarly, the low pressure surface 144 of the aileron 132—considering the aileron as a separate lifting body—constitutes a portion of the high pressure surface 122 of the overall rotor blade 120 and functions as a high pressure surface.

Currently, a NACA $64_3618$ profile is preferred for the main section 134. A NACA 4424 profile is preferred for at least the forward portion of the low pressure surface 144 of the aileron 132, i.e., the portion extending from the nose 138 of the aileron to a point 146 located somewhere behind the center of rotation 136. The high pressure surface 142 should constitute a smooth, continuous extension of the profile of the main section 134 of the rotor blade 120. The aileron 132 constitutes 40% of the overall chord of the rotor blade 120, and runs from the 67% radial position to the 98% radial position.

The aileron 132 can be mounted to the main section 134 of the rotor blade 120 with a trunnion and pivot arm hinge assembly. Such an assembly is described in U.S. Pat. No. 5,320,491, issued to Coleman et al. on Jun. 14, 1994, which is incorporated by reference.

The hinge assembly should be constructed such that the center of rotation 136, i.e., the hingeline, of the aileron 132 is located inside the "envelope" of the aileron 132. Chordwise, the center of rotation could be located from about the ten to about the fifty percent chord point. Preferably, the center of rotation 136 is located from about the twenty-five to about the thirty-five percent chord point. The center of mass 137 of the aileron, or a position slightly behind the aerodynamic center 139 of the aileron, is usually an optimal location.

The center of rotation 136 may be located anywhere between the high pressure surface 142 and low pressure surface 144. It is preferable, however, for the center of rotation 136 to be positioned vertically as close to the center of mass 137 of the aileron 132 as possible.

The inverted airfoil profile of the aileron 132 and the location of the center of rotation 136 work synergistically to yield enhanced aileron performance. The location of the center of rotation 136 optimizes hinge forces and moments. If the center of rotation 136 is at or near the center of mass 137 of the aileron, gyroscopic moments, induced when moving the center of mass 137 of the aileron transverse to the plane of rotation of the rotor assembly, will be substantially reduced or eliminated.

As the aileron is deflected, the location of the center of pressure 140 varies. Locating the center of rotation 136 so that, while the aileron moves within the control range of angles the center of pressure remains at or near the center of rotation—i.e., substantially balancing pressure forces fore and aft of the center of rotation 136—reduces hinge moment and hence actuation forces required to rotate the aileron.

Ideally, the center of rotation 136 should be located so as to remain slightly ahead of the center of pressure 140. This provides a fail-safe configuration in that, should power be lost in the aileron actuation system, the aileron 132 will rotate in the negative direction, providing braking power and preventing an overspeed condition.

The arcuate, airfoil profile of the aileron 132 is extremely important. It makes it possible to locate the center of rotation 136 inside the envelope of the aileron, with the attendant benefits described above, while using the aileron 132 for strong, positive control function. Strong positive control function refers to the ability of the aileron 132 to adjust the lift and drag on the rotor blade 120 smoothly, continuously, and predictably through a large range of deflection angles $\beta$ as exemplified in FIGS. 5 and 6. As wind and rotor speed conditions change, and hence the angle of attack $\alpha$, the aileron 132 is deflected so as to "move" the rotor blade 120 "onto" another lift and drag curve, thereby maintaining control of the rotor assembly by controlling lift, drag, and hence suction. It is essential that the lift and drag curves, for varying deflection angles $\delta$, be smoothly continuous. Otherwise, predictable control of the rotor assembly is not possible.

Figure 7A:
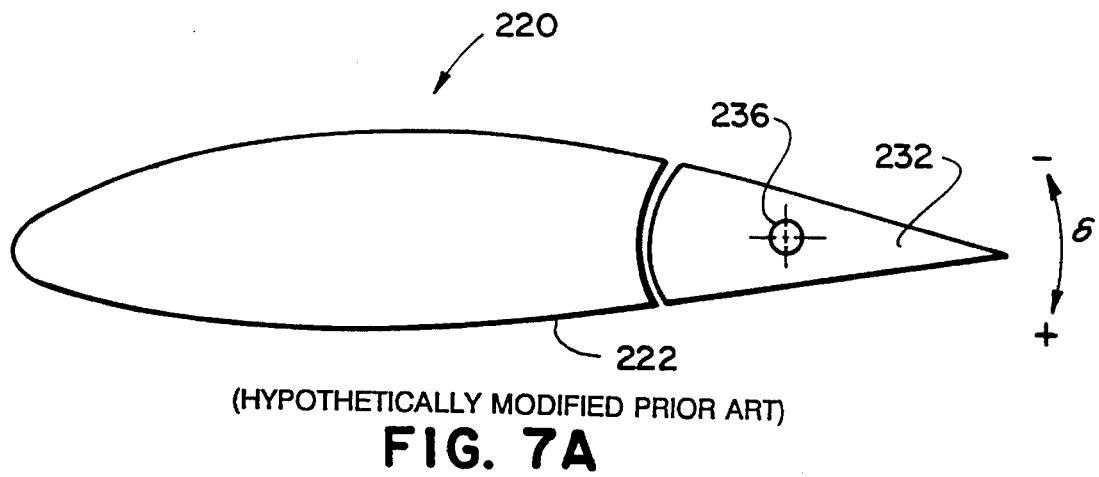
FIGS. 7A and 7B are section views of a prior rotor blade/aileron configuration hypothetically modified to have the hinge location of the present invention.
Figure 7B:
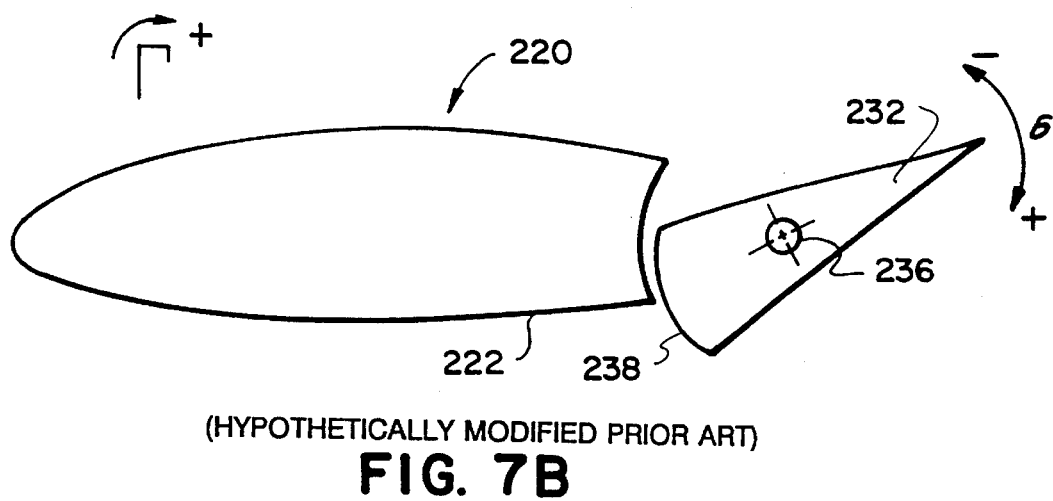

Were a conventional, rotor-segment type aileron 232 to be mounted on a hinge 236 located within the envelope of the aileron 232, as shown in FIG. 7A, negative deflection of the aileron 232 would cause the nose 238 of the aileron to protrude into the airstream flowing along the high pressure surface 222 of the rotor blade 220, as shown in FIG. 7B. The protruding nose 238 would create a back pressure on the high pressure side of the rotor blade 220 which would add a positive component to the circulation $\Gamma$ about the rotor blade. The positive component of circulation $\Gamma$ would serve to increase lift—a result opposite that desired—and would make changes in lift and drag with changes in deflection angle $\delta$ far less predictable. Control of the rotor assembly would therefore be far more difficult to maintain. (Positive deflections of the aileron would exhibit similar confounding effects on control.)

Figure 5:
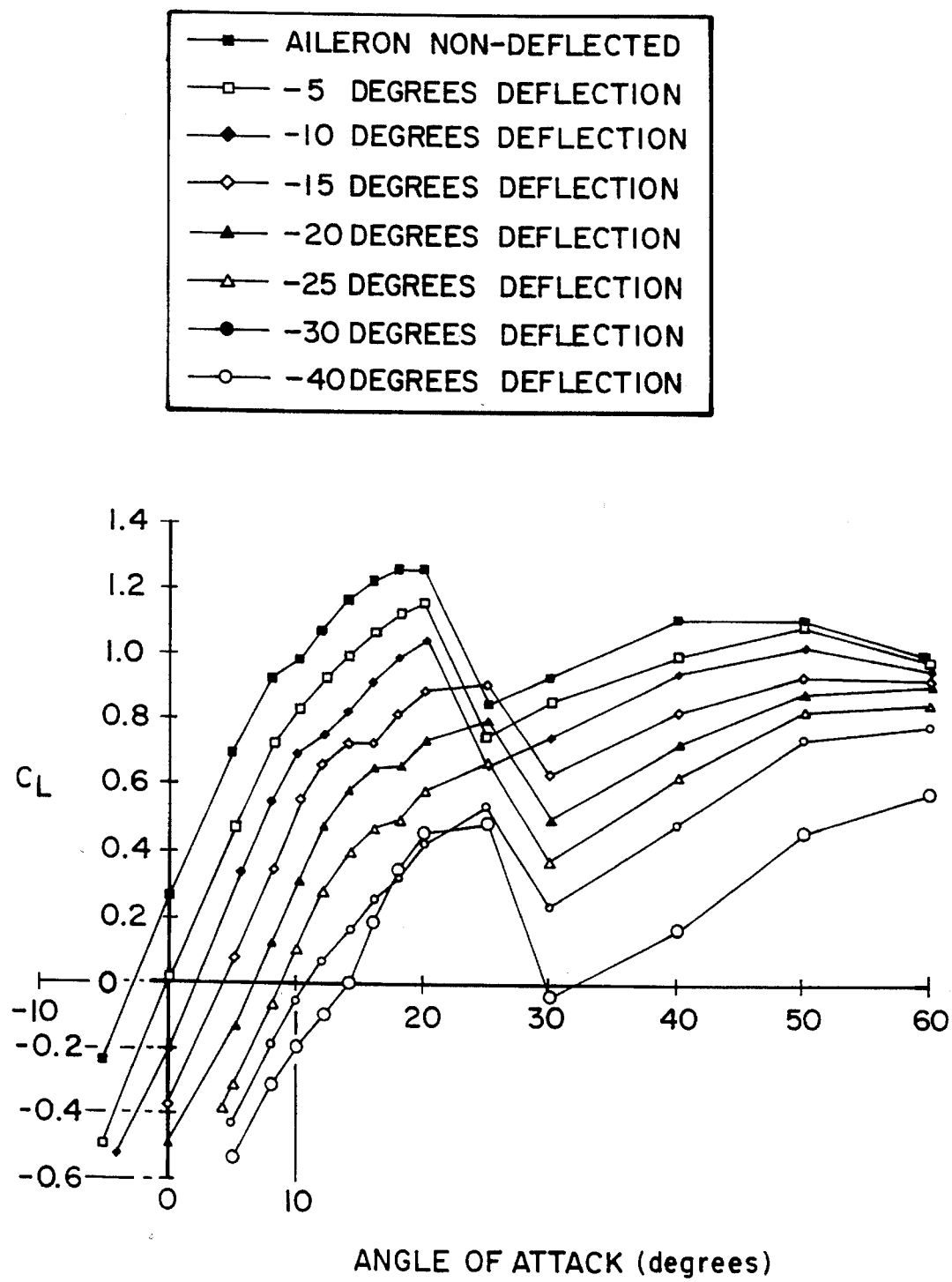
FIGS. 5 and 6 are graphs showing variation of lift and drag coefficients, as functions of angle of attack α, for varying deflection angles δ.
Figure 6:
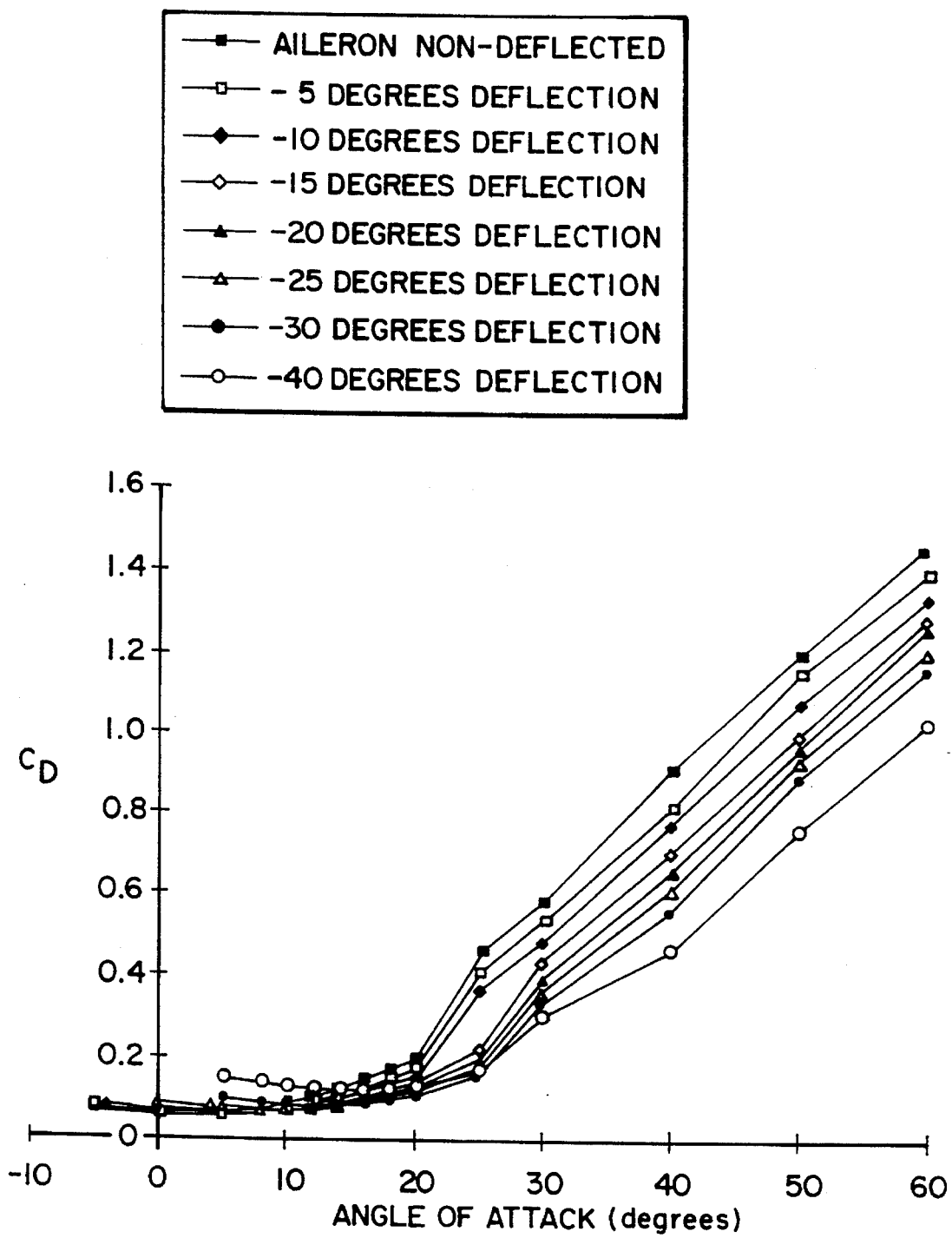

The arcuate airfoil profile of the aileron 132 substantially reduces or eliminates these backpressure effects. As shown in FIG. 4B, where the aileron 132 is rotated by the same amount as the aileron 232 in FIG. 7B, the high pressure surface 122 of the rotor blade 120 remains relatively streamlined. Even at deflection angles $\delta$ on the order of $-40°$, as shown in FIG. 4C, the high pressure surface 122 of the rotor blade 120 remains relatively streamlined with minimal disturbance of the airflow. As a result, the airflow substantially follows the contour of the rotor blade 120 and the rotor blade 120 "moves" smoothly from one lift or drag curve to the next, as shown in FIGS. 5 and 6, with changing deflection angle $\delta$. This smooth progression enables predictable regulation of the rotor's performance, e.g., via a control scheme as described in the above cited U.S. Pat. No. 5,320,441.

It has been found that the "cove" 150 defined by the nose 138 of the aileron 132 and the trailing edge 152 of the main section 134 of the rotor blade causes no appreciable degradation in performance of the aileron 132 or of the rotor blade 120 as a whole. Furthermore, although the leading edge 138 of the aileron 132 will protrude slightly above the low pressure surface 128 upon positive deflection of the aileron 132, positive deflections are generally not employed as often as negative deflections, and the magnitude of positive deflections are usually less than three degrees. Thus, slight protrusion of the leading edge 138 of the aileron 132 above the low pressure surface 122 is acceptable.

Figure 8:
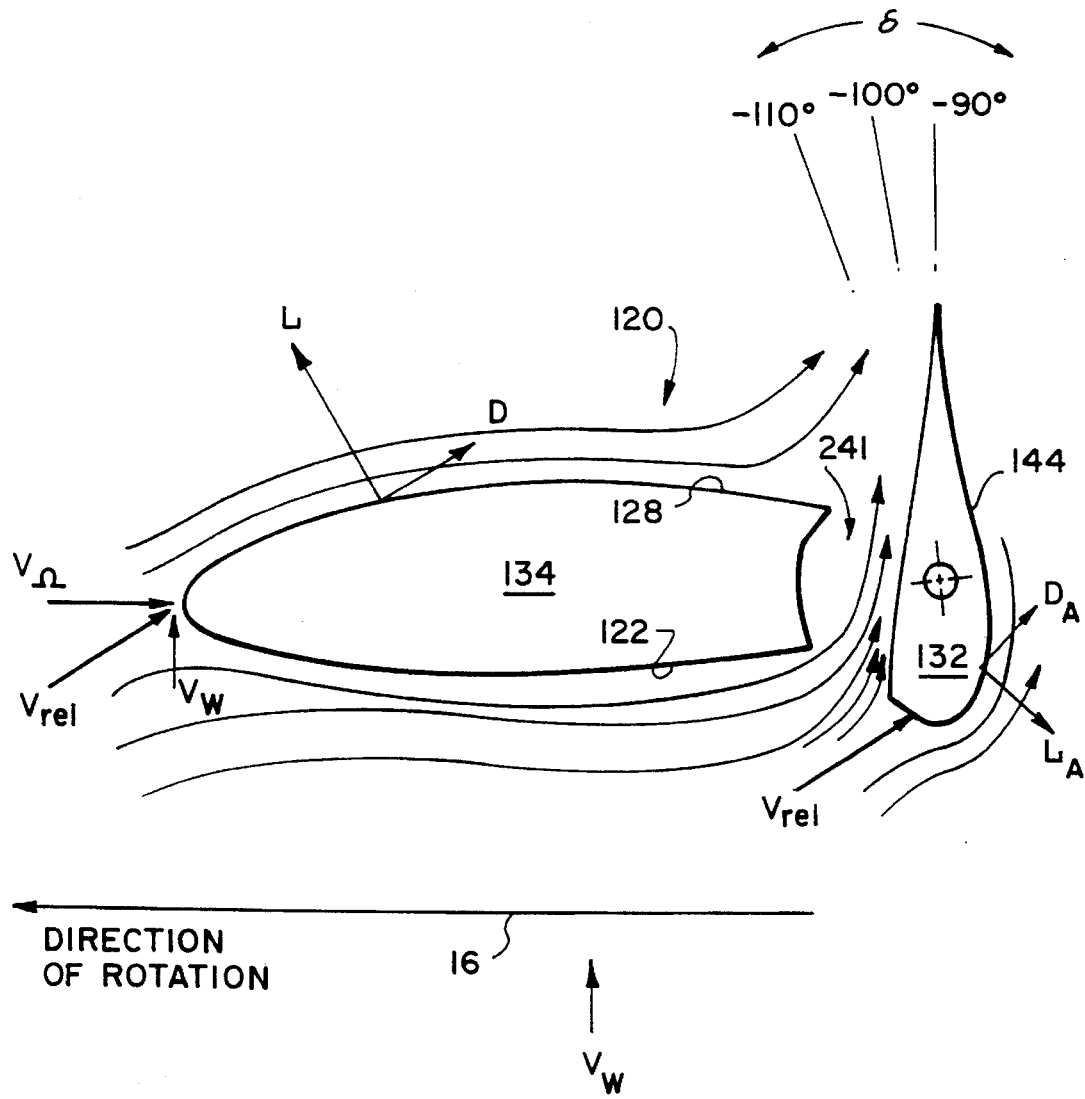
FIG. 8 is a section view of a wind turbine rotor blade and aileron, according to the invention, showing the aileron rotated to a deflection angle δ within the shutdown range.

Perhaps the most important benefit of the airfoil shape of the aileron 132 is realized when the wind turbine is put into shutdown mode and the ailerons are used to stop rotation of the rotor assembly. When the wind turbine is put into shutdown mode, such as when the electrical power load on the system is lost or when wind speeds become excessive, the ailerons 132 are deflected to deflection angles $\delta$ on the order of $-90°$ to $-110°$, as shown in FIG. 8. At such a deflection angle, a sizable flow gap 241 is opened up between the aileron 132 and the main section 134 of the rotor blade 120. The flow gap 241 allows air flowing along the high pressure surface 122 of the rotor blade 120 to pass through to the low pressure side of the rotor blade 120, disrupting airflow along the low pressure surface 128 and partially destroying lift L.

Furthermore, a portion of the relative wind striking the aileron 132 with velocity $V_{rel}$ (the vector sum of the tangential velocity vector $V_\Omega$ and the free-stream wind vector $V_W$) will pass through the flow gap 241, and a portion will pass over the arcuate, low pressure surface 144 (which, when the aileron was deflected by a small amount, was functioning as a high pressure surface). Given the arcuate airfoil profile of aileron 132 and the flow induced around it, lift $L_A$—i.e., low pressure—will be generated along surface 144 of aileron 132. Drag $D_A$ will also be generated by the aileron 132. In essence, aileron 132 will perform as a separate, independent lifting body.

The aileron-generated lift and drag, $L_A$ and $D_A$, have components which are directed opposite the direction of rotation of the rotor blade 120. Given the lift-destroying flow disruption caused by air passing through the flow gap 241, and the aileron generated lift and drag $L_A$ and $D_A$, a negative suction force is created opposite the direction of rotation which is sufficient to overcome the forward acting, positive suction force generated along the inboard, non-aileron portion of the rotor blade 120. As a result, rotation of the rotor assembly is slowed and brought to a stop.

As the rotor decelerates, the tangential velocity $V_\Omega$ decreases. As a result, the relative wind velocity vector $V_{rel}$, the vector sum of the $V_\Omega$ and $V_W$ velocity vectors, decreases in magnitude and "rotates" counter-clockwise, as shown in FIG. 8, such that it more nearly parallels $V_W$. Aileron generated lift and drag $L_A$ and $D_A$ can be maintained at optimal levels by continuing to deflect the aileron in the negative direction as the rotor assembly slows, keeping the aileron 132 at an optimal angle of attack with respect to the relative wind. Once the rotor assembly has stopped, the relative wind velocity will be the same as the free-stream wind velocity. The aileron 132 can be maintained at a deflection angle $\delta$, on the order of $110°$ to $120°$, which causes lift $L_A$ and drag $D_A$ to be generated which counteract the rotation-starting deflection forces.

Figure 9A:
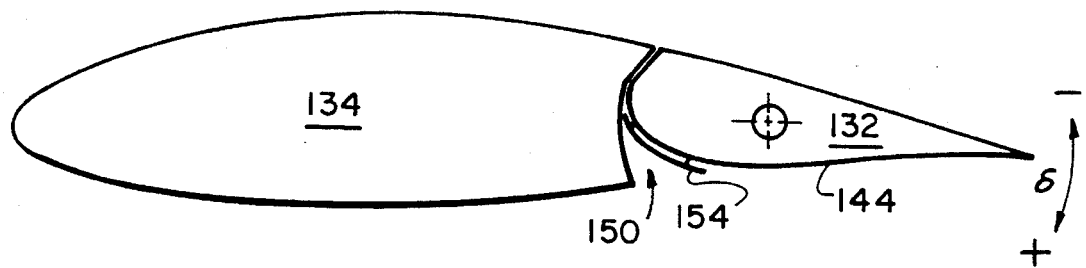
FIGS. 9A, 9B, 10A, and 10B are section views of a wind turbine rotor blade and aileron, according to the invention, provided with aileron lift enhancing devices.
Figure 9B:
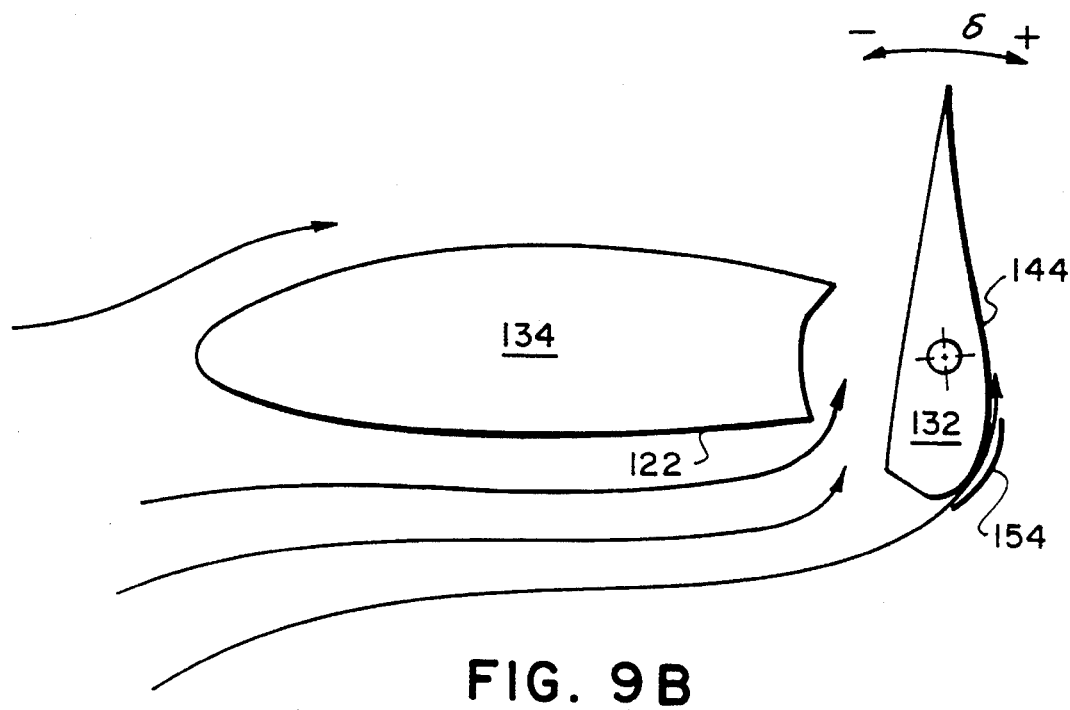

As may be appreciated, proper flow around the aileron 132 is essential to its performance, both in the positive control range of deflection angles ($\delta$ on the order of $+3°$ to $-40°$) and in the shutdown range of deflection angles ($\delta$ on the order of $-60°$ or more). It is important that the airflow over surface 144 stay attached over the entire range of deflection angles $\delta$. To help ensure this, a deflector vane 154 can be mounted at the leading edge of the aileron 132, as shown in FIGS. 9A and 9B. The deflector vane 154 is simply a curved strip of stiff material, e.g., sheet metal or plastic, mounted parallel to and spaced slightly away from the leading edge of the aileron 132. As shown in FIG. 9A, the deflector vane 154 remains shielded in the cove 150 while the aileron 132 is within the control range of deflection angles $\delta$. When the aileron 132 is deflected to greater deflection angles, such as to shut down rotation of the rotor, the deflector vane 154 becomes exposed to the flow along the high pressure surface 122 of the rotor blade 120 and helps guide the flow around the aileron and along surface 144, as shown in FIG. 9B.

Figure 10:
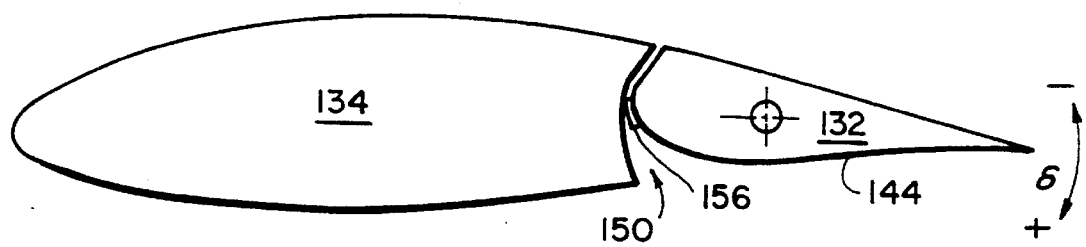
Figure 10:
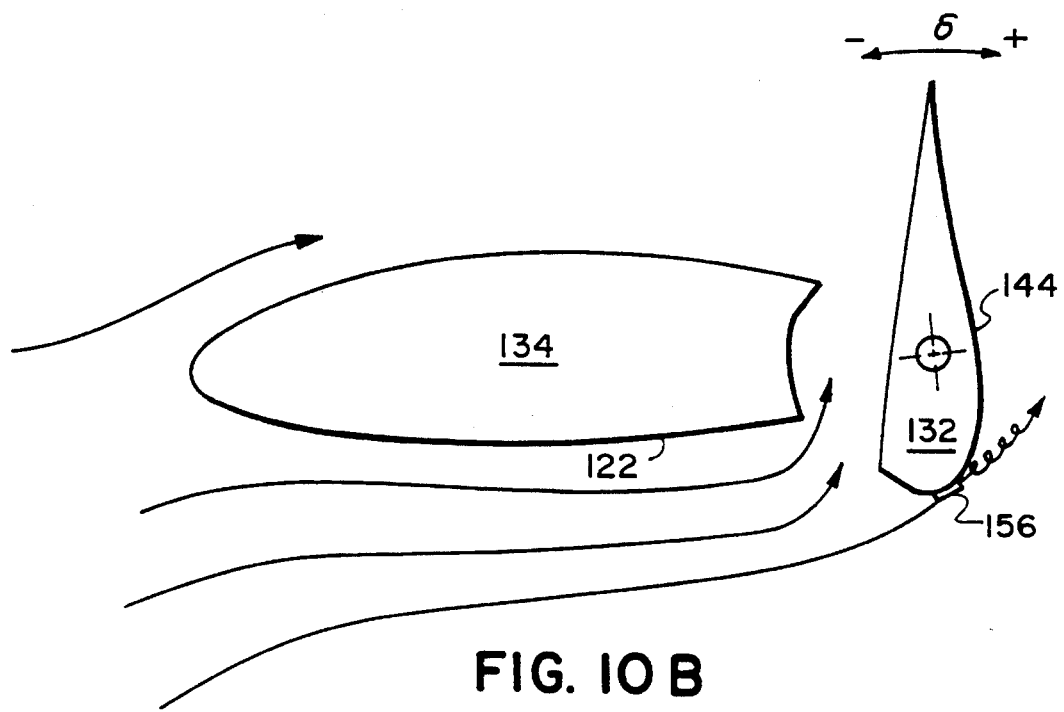

Alternatively, or in combination with the deflector vane 154, vorticity generators 156 can be added along the leading edge of the aileron 132, as shown in FIGS. 10A and 10B. The vorticity generators 156 are low aspect ratio "vanes" which are canted slightly, i.e., they have an angle of attack, relative to the airstream flowing past them. This creates vorticity in the airstream, thereby energizing the boundary layer and making it less susceptible to adverse pressure gradients. Flow separation of the boundary layer is delayed, and lift $L_A$ generated by the aileron 132 is enhanced.

Figure 11:
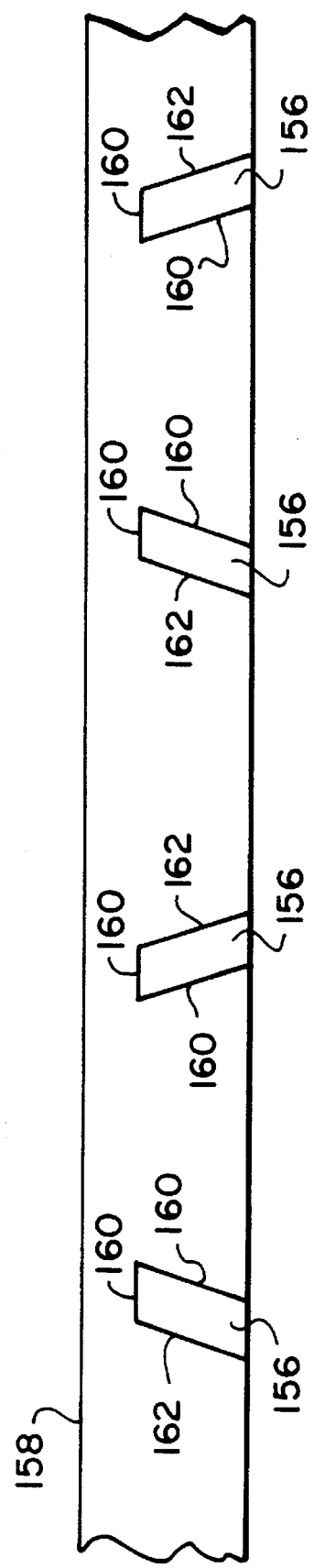
FIG. 11 is a part pattern used to construct the lift enhancing devices of FIGS. 10A and 10B.

Vorticity generators 156 can be installed simply by tacking a strip of sheet metal 158, with cuts along cutting lines 160 as shown in FIG. 11, to the leading edge of the aileron. The vorticity generators 156 are then formed by folding the sheet metal segments up along fold lines 162. Like the deflector vane 154, the vorticity generators 156 are shielded within cove 150 while the aileron 132 is within the control range of deflection angles δ, and they are exposed when the aileron 132 is rotated into the shutdown range of deflection angles δ.

Figure 12:
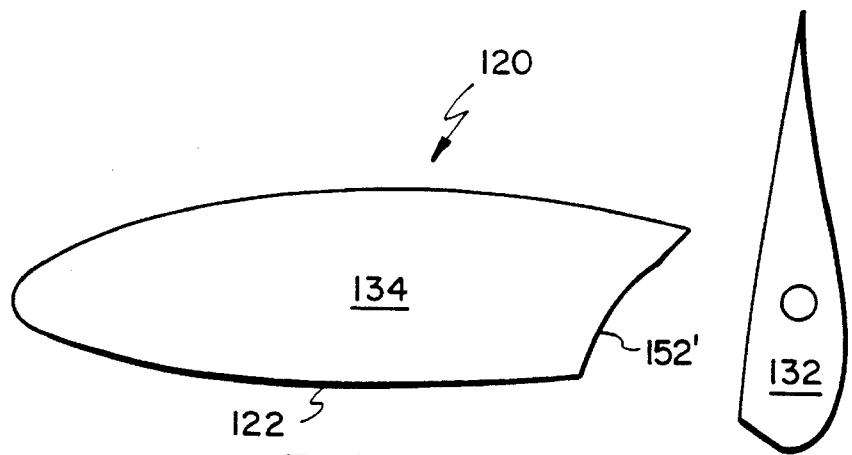
FIGS. 12A, 12B, and 12C are section views of a wind turbine rotor blade and aileron, according to the invention, showing various flow gap configurations.
Figure 12:
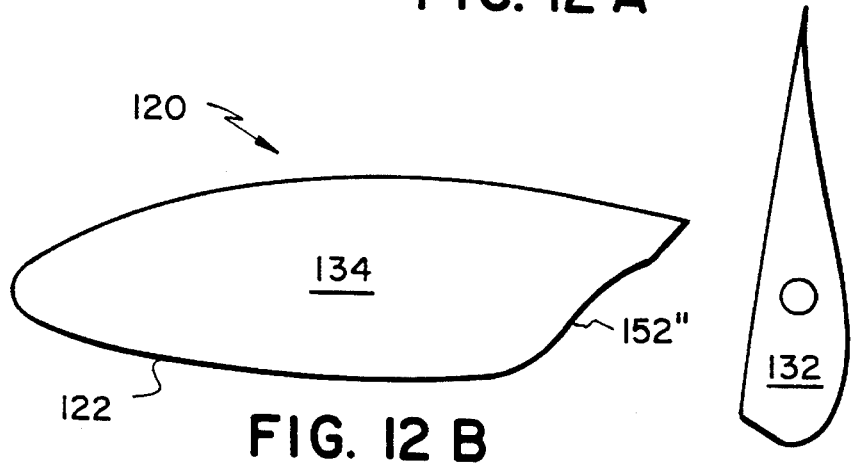
Figure 12:
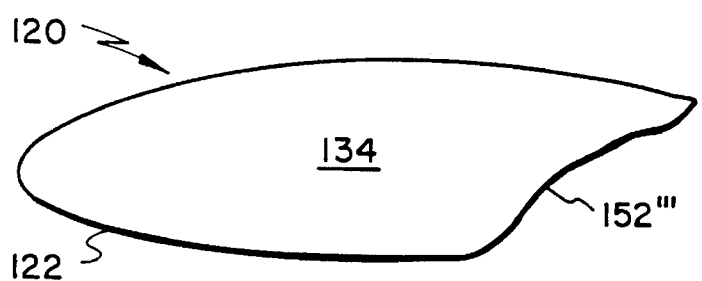

As another alternative, the contours of the cove 150 can be varied to achieve optimal flow around the aileron 132. As shown in FIGS. 12A, 12B, and 12C, the trailing edge 152', 152", or 152''' of the main section can be shaped to facilitate flow from the high pressure side of the rotor blade 120 to the low pressure side of the rotor blade. Nozzle or throat flow laws would guide design of the specific contours.

Although the inverted airfoil aileron configuration described thus far provides excellent shutdown capabilities in most situations, it has been found that for some rotor blade configurations the aileron does not generate enough lift to overcome entirely the rotation-inducing torque produced by the non-aileron sections of the blade. This may be particularly true where the aileron of the present invention is retrofitted onto an existing rotor system, such that the performance characteristics of the non-aileron portions of the rotor blade are previously fixed. In such a situation, the inboard, non-aileron sections of the rotor blade can be modified to reduce the suction force generated thereby.

Figure 13:
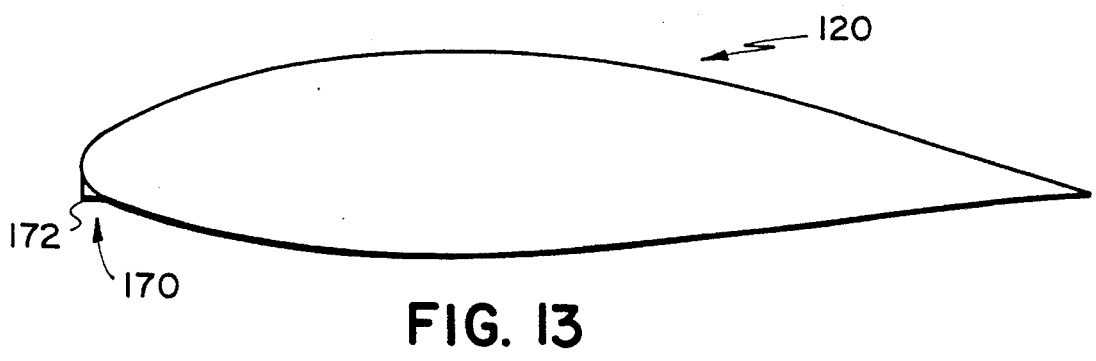
FIG. 13 is a section view of a non-aileron section of the rotor blade, retrofitted to have a sharp radius nose to reduce lift generated by the section at high angles of attack.

As one example of such a suction-reducing modification, the blade can effectively be given a sharp radius nose by mounting a length of angle iron 170, or other stiff, angled material, to the leading edge of the rotor blade 120 along an inboard, non-aileron portion of the blade, as shown in FIG. 13. The angle iron is mounted with the angle "opening" toward the rotor blade and with the edge 172 facing outward. The angle iron effectively changes the radius of curvature of the blade and moves the stagnation point such that at critical, high angles of attack associated with a shutdown condition, lift is reduced slightly and drag is increased slightly. Lift is further reduced, at higher angles of attack, because the angle iron disrupts laminar flow along the high pressure surface of the blade. The net effect, therefore, it to decrease the suction force generated by that section of the blade. Given sufficient suction reduction, lift generated by the ailerons should enable complete shutdown of the rotor assembly.

Other embodiments and configurations are within the scope of the following claims.

What is claimed is:

1. A wind turbine rotor assembly comprising
   a rotor blade having a main section with an arcuate, airfoil profile, and
   an aileron with an arcuate, airfoil profile over at least a portion of the surface of said aileron rotatably connected to said main section with the arcuate, airfoil profile of said aileron inverted relative to the arcuate, airfoil profile of the main section,
   said aileron comprising a lift generating body which generates lift when said aileron is rotated to a deflection angle within a shutdown range of angles, said lift having a component which acts in a direction opposite the direction of rotation of said rotor assembly.

2. The rotor assembly of claim 1 wherein
   said main section has a low pressure surface and a high pressure surface,
   said aileron has a low pressure surface and a high pressure surface, and
   when the aileron is deflected to a deflection angle within a control range of angles, the high pressure surface of the aileron forms an effective continuation of the low pressure surface of the main section and the low pressure surface of the aileron forms an effective continuation of the high pressure surface of the main section such that deflecting said aileron to varying deflection angles within said control range of angles enables strong positive control of lift and drag generated by the rotor assembly.

3. The rotor assembly of claim 1 wherein said main section has a trailing edge, said aileron has a leading edge, and said trailing edge and said leading edge define a cove along an undersurface of said rotor blade.

4. The rotor assembly of claim 3 wherein deflection of said aileron to a deflection angle within said shutdown range of angles opens a flow gap which allows air to flow from a high pressure side of said rotor blade to a low pressure side of said rotor blade, said flow gap partially defined by said trailing edge of said main section.

5. The rotor assembly of claim 1 further comprising a lift enhancing device disposed along a leading edge of said aileron.

6. The rotor assembly of claim 5 wherein said lift enhancing device comprises a deflector vane.

7. The rotor assembly of claim 5 wherein said lift enhancing device comprises vorticity generators.

8. The rotor assembly of claim 1 further comprising a supplemental suction-reducing member connected to said rotor blade.

9. The rotor assembly of claim 8 wherein said supplemental suction-reducing member decreases lift generated by said rotor blade.

10. The rotor assembly of claim 8 wherein said supplemental suction-reducing member increases drag created by said rotor blade.

11. The rotor assembly of claim 8 wherein said supplemental suction-reducing member comprises a sharp radius nose member attached to a leading edge portion of the rotor blade.

12. The rotor assembly of claim 11 wherein said sharp radius nose member comprises a length of stiff, angled material.

13. A wind turbine rotor assembly comprising
    a rotor blade having a main section with an arcuate, airfoil profile, and
    an aileron with an arcuate, airfoil profile over at least a portion of the surface of said aileron rotatably connected to said main section via a hinge and rotating about a center of rotation, said center of rotation lying within the envelope of said aileron and the arcuate, airfoil profile of said aileron being inverted relative to the arcuate, airfoil profile of said main section.

14. The rotor assembly of claim 13 wherein said aileron has a profile which enables said aileron to rotate about said center of rotation through a control range of deflection angles without protruding in a flow-disrupting manner into air flowing past said rotor blade.

15. The rotor assembly of claim 14 wherein said aileron generates lift.

16. The rotor assembly of claim 13 wherein said aileron has a profile which enables strong positive control of said rotor assembly.

17. The rotor assembly of claim 13 wherein said center of rotation lies near the center of mass of said aileron.

18. The rotor assembly of claim 13 wherein said aileron has a center of pressure and said center of pressure remains near said center of rotation while said aileron moves through deflection angles within a control range of angles.

19. The rotor assembly of claim 18 wherein said center of rotation lies ahead of said center of pressure.

20. The rotor assembly of claim 13 wherein said aileron has a chord length and said center of rotation lies about ten to about fifty percent of the chord length of said aileron from the nose of said aileron.

21. The rotor assembly of claim 13 wherein said aileron has a chord length and said center of rotation lies about twenty-five to about thirty-five percent of the chord length of said aileron from the nose of said aileron.

22. The rotor assembly of claim 13 wherein said aileron comprises a lift generating body which generates lift when said aileron is rotated to a deflection angle within a shutdown range of angles, said lift having a component which acts in a direction opposite the direction of rotation of said rotor assembly.

23. The rotor assembly of claim 22 wherein the location of said center of rotation enables said aileron to rotate relative to said main section such that said main section and said aileron function as independent lift-generating bodies.

24. The rotor assembly of claim 13 wherein said center of rotation lies at the center of mass of said aileron.

25. The rotor assembly of claim 13 wherein said aileron has a center of pressure and said center of pressure remains at said center of rotation while said aileron moves through deflection angles within a control range of angles.

26. The rotor assembly of claim 25 wherein said center of rotation lies ahead of said center of pressure.

27. A method of controlling the rotational performance of a wind turbine rotor, said wind turbine rotor comprising rotor blades and ailerons connected to trailing edges of said rotor blades, said method comprising deflecting said ailerons to deflection angles within a shutdown range of deflection angles to create lift on said ailerons, said lift having a component acting in a direction opposite the direction of rotation of said wind turbine rotor.

28. The method of claim 27, further comprising deflecting said ailerons to deflection angles within a control range of deflection angles to alter lift and drag generated by said rotor blades in a smoothly continuous and predictable fashion.

* * * * *